United States Patent

[11] 3,538,830

[72] Inventors Elmer C. Henriksen
Chicago, Ill., and
Carl P. Tinebra, Mountain View, California
[21] Appl. No. 735,285
[22] Filed June 7, 1968
[45] Patented Nov. 10, 1970
[73] Assignee Bell & Howell Company
Chicago, Illinois
a corporation of Illinois

[54] SEMIAUTOMATIC MOTOR-DRIVEN LENS FOCUSING MECHANISM
10 Claims, 3 Drawing Figs.
[52] U.S. Cl.................................................. 95/44,
95/45; 352/140; 353/101
[51] Int. Cl........................................................ G03b 13/20
[50] Field of Search............................................ 95/44, 45;
352/140; 353/101(Inquired)

[56] References Cited
UNITED STATES PATENTS
1,301,897 4/1919 Becker.......................... 95/44
3,450,018 6/1969 John.............................. 95/45

Primary Examiner—John M. Horan
Assistant Examiner—M. L. Gellner
Attorneys—William F. Pinsak and John E. Peele, Jr.

ABSTRACT: A distance determining mechanism for a camera having a focusable objective, the mechanism including a pendulous member mounted for orientation by gravity to cause adjustment of the objective into focus on a remote subject. The distance is determined by triangulation based on orientation to an angular aspect of the pendulous member upon alignment of the axis of the objective at the base of the remote subject. The objective is adjusted by a motor for a time determined by a control circuit responding to orientation of the pendulous member through resistance variations as that member is oriented relative to a resistive element in the control circuit.

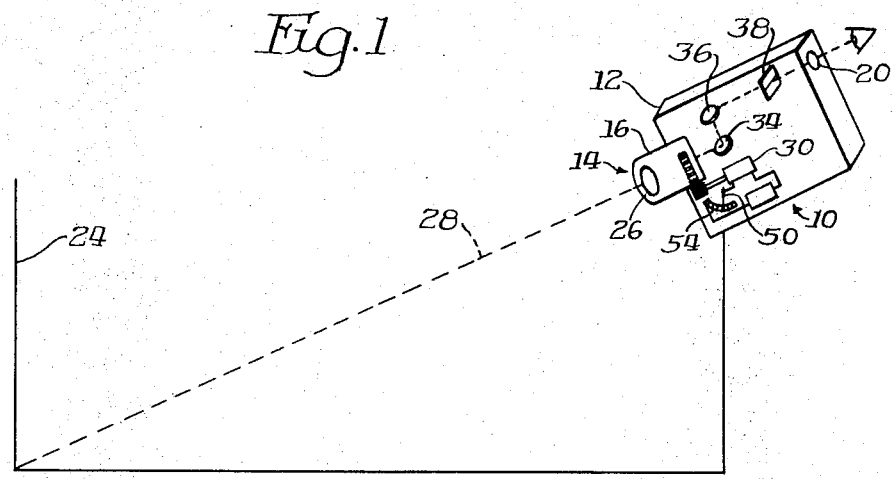
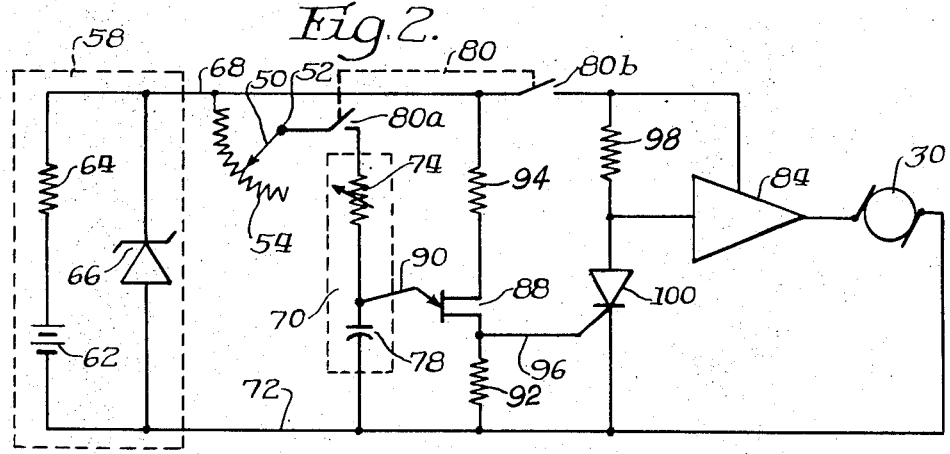
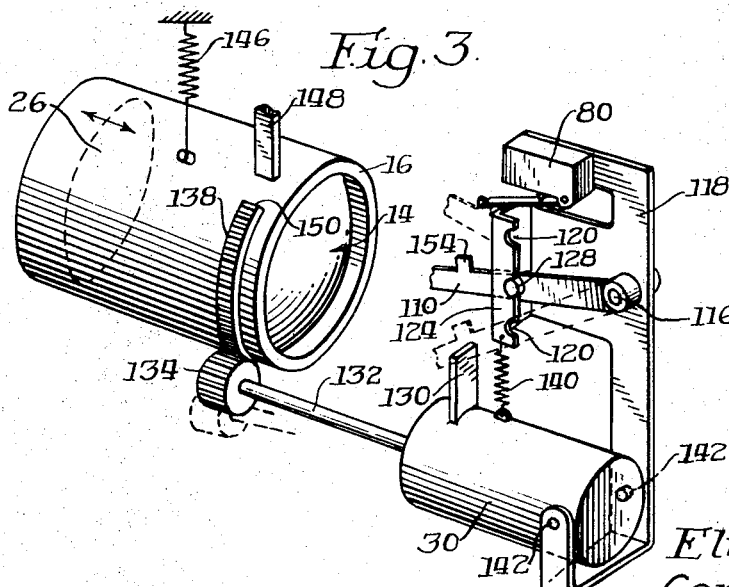
Inventors:
Elmer C. Henriksen,
Carl P. Tinebra
By William F. ...
John E. Peele Jr.    Attys.

3,538,830

SEMIAUTOMATIC MOTOR-DRIVEN LENS FOCUSING MECHANISM

The present invention relates to a camera focusing mechanism, and particularly to a mechanism for adjusting a focusable lens of a camera in response to focal distances determined by a rangefinding device functioning on the principle of triangulation. The lens is adjusted by a motor in a control circuit responsive to the orientation of a gravity influenced member.

The triangulation principle relates to the computation of the length of one side of a right triangle, herein the camera-to-subject distance. To compute the distance, the height of either the vertical side or the length of the hypotenuse of the triangle, and one of the angles other than the right angle must be known. For use of the principle in a camera focusing arrangement, the length of the vertical side of the triangle may be empirically determined as the "height of an average adult" above the supporting plane on which the user stands. Thus, the vertical side will be approximately the same in most uses to which a camera is put. By having the user align the base of a remote subject with a reference mark in the viewfinder of the camera, the camera is caused to be angled by determinable amounts. That is, the user views the subject at the point where a vertical line through the subject intersects the supporting plane. The optical axis of the camera's lens may be repeatably angled at a given angle relative to both the vertical side and the base side of the triangle. Hence, the required values necessary to compute the unknown length of the base line are available.

The present invention seeks to eliminate the need for mathematical computation by the user by providing a mechanism which functions to focus the lens on a semiautomatic basis. To determine the angle of inclination of the optical axis, a pendulous member orientable under the influence of gravity is arranged to pivot about an axle which extends perpendicularly of the optical axis. When the user sights the base of a subject at infinity, the optical axis remains horizontal with a base line on which both the subject and the user are supported. Hence, the pendulous member remains vertical and therefore perpendicular to the horizontally oriented optical axis. However, if the user sights the base of a near subject, the optical axis and camera housing will be inclined relative to the horizontal base line. As the housing is inclined, the pendulous member, if free, will remain fixed in space continuing to hang vertically under the influence of gravity. In this orientation, the pendulous member is understood to be displaced from the optical axis by a given angle. Since the range of angular displacements corresponding to the range of focus planes of the lens can be determined, these values may be built into a focusing mechanism to adjust the focus of the lens for that given distance.

Translation of the angular orientation of a pendulous member to focus distance for adjustment of the focus plane of a lens may be accomplished through mechanical and electromechanical mechanisms. A mechanism found to be advantageous is of the latter category in which the pendulous member is an electric contact swinging relative to a resistive element. In response to variations of a resistance introduced in a motor control circuit by different positions of the contact on the element, a motor is energized to focus the lens on a subject. The circuit developed employs relatively inexpensive components interconnected in a relatively simple manner. The particular circuit energizes the motor, times the duration during which the motor is energized, and deenergizes the motor at the precise moment required. Thus, it can be seen that to focus a lens by the system of this invention, the user need only view the base of a subject, and actuate a control. The camera may subsequently be righted for framing of a scene, and the camera operating button pushed.

Prior focusing and rangefinding systems for cameras or other optical instruments have generally required manual operation by the user. Most of these systems have been of the short base variety in which the angle-defining component is within a few inches of the reference base line relative to which the angle is determined. The short base is limited by the size of the instrument's housing. Hence, extremely accurate and relatively complex mechanisms have been required to determine camera-to-subject distances. Further, these mechanisms often add significantly to the cost of the instrument since assembly and adjustment of the many parts requires this aspect of the instrument to require careful adjustment.

In view of the disadvantages of the prior art, an object of the instant invention is to provide a novel distance determining mechanism.

Another object of the invention is to provide a distance determining mechanism operable in a semiautomatic manner on the principle of triangulation.

Yet another object of the invention is to provide a distance determining mechanism for use with an instrument having a focusable objective, the objective being focused by power.

Further and other objects will be apparent from the description of the accompanying drawings in which like numerals refer to like parts.

In the drawings:

FIG. 1 is a schematic and perspective view of an optical instrument incorporating the focusing mechanism of this invention;

FIG. 2 is a schematic diagram of the circuitry associated with the present focusing mechanism; and FIG. 3 is a schematic diagram in perspective disclosing elements of the focusing mechanism.

Referring to FIG. 1, there is shown an optical instrument such as camera 10, comprising a housing having front wall 12 for supporting a focusable objective or lens assembly 14, in lens barrel 16, and rear wall 18 including opening 20 through which a user may view the image of remote subject 24. Subject 24, shown schematically as a line, is focused by lens 14 onto an image plane (not shown). For different camera-to-subject distances, the focal plane of lens 14 must be varied to bring that plane into coincidence with the image plane. A focusing lens cell, shown as element 26, is made adjustable in a direction parallel with optical axis 28 to vary the focal plane. In this exemplary disclosure, a motive means, shown as small motor 30, is operably connected to focusing lens cell 26 to reciprocate the same along optical axis 28.

The viewing system comprises first and second image reflecting devices, shown as mirrors 34, 36 for directing the image toward opening 20. In the viewing system and arranged to be visible therein is a reference mark 38 relative to which the image of the subject may be positioned for determining the distance to the instrument. When the instrument is oriented to align the point of intersection of a vertical line through the subject and a base plane common to the subject and user, optical axis 28 of lens 14 defines the hypotenuse of a triangle by use of which the length of the base line between the instrument and the subject can be determined.

The distance determining mechanism includes pendulous member 50 mounted for rotation about axis 52 which extends in a plane with, but perpendicular to the optical axis. As schematically represented in FIG. 2, one end of the pendulous member moves as a wiper across resistive element 54 as pendulous member 50 is oriented swingably under the influence of gravity. In all of the positions of this swingable member or wiper against the resistive element, a different resistance is introduced into an electric circuit to ultimately focus objective lens 14.

Pendulous member 50 and resistive element 54 are connected to a control circuit shown schematically in FIG. 2. The circuit in which motor 30 is also connected, includes controlled power supply 58 comprising a power source such as battery 62, fixed resistance 64 in series with the battery, and zener diode 66 in parallel with the battery. The diode regulates the voltage output of the battery wherein a constant voltage is introduced to the balance of the circuit. By conductor 68, one side of power supply 58 is connected to either wiper 50 or to resistive element 54. In this preferred embodiment, the wiper is connected by conductor 72 to the other side of the supply through timing network or circuit 70.

The timing circuit functions to control the length of time during which the objective is driven for focusing. Timing circuit 70 includes adjustable resistance 74, which remains fixed after a preliminary or factory adjustment to accommodate the circuit for variations in other aspects of the objective focusing system. The circuit also includes capacitor 78 which receives current in varying quantities as controlled by the adjusted resistance and resistive element 54. By the varying quantities of current fed into the capacitor, it is charged to a given percentage of capacity at varying rates. The rate of charge is primarily varied by the position of wiper 50 on resistive element 54, which creates a high resistance when the wiper is near the lower end as oriented in FIG. 2, and a low resistance when the wiper is near the upper end. The charging times of the capacitor are thus seen to be relatively long and short, respectively, as the current flow thereto is altered.

Current flow from power supply 58 to the balance of the circuit and the motor is initiated upon manual closure of normally open switch 80. The switch includes a pair of contact sets 80a, 80b shown physically separated, but mechanically interlocked for simultaneous actuation. Upon closure of switch 80, full voltage is fed from power supply 58 to motor amplifier and switch circuit 84. This circuit in turn energizes the motor to full "on". As the motor is energized, the other contact set of switch 80 also closes to initiate current flow into timing circuit 70, and thereby initiates the timing period during which the motor is operated.

After a quantity of voltage is fed from power supply 58 into timing circuit 70 to charge capacitor 78, the capacitor discharges into unijunction transistor 88. The transistor, connected to the timing circuit by conductor 90, is in series circuit with a pair of resistors 92, 94 and conductor 96 connected to silicon controlled rectifier 100, which is in series with resistor 98. The lower resistor 92 is selected of a value to determine the voltage to which capacitor 78 must be charged before discharging through transistor 88. Upon discharge of capacitor 78, a positive going trigger pulse is generated by the transistor, and fed into conductor 96.

Conductor 96 connects transistor 88 to silicon controlled rectifier 100 to cause that rectifier to be turned "on" in response to the trigger pulse. Before the SCR is triggered "on", it is effectively a high-resistance element causing a relatively positive polarity current flow into the motor amplifier which in turn permits operation of the motor. However, after the trigger pulse voltage is received by the SCR the resistance through it drops, effectively turning it "on". In turn, the SCR turns "off" the motor amplifier which deenergizes motor 30. When the motor is deenergized, lens 14 has been moved for a predetermined time in an axial direction to bring the image of a remote subject into focus on the image plane in the camera.

Manually operable control member 110 is shown in FIG. 3 as a lever to which other linkage members can be connected for actuation externally of the camera housing. Control member 110 is provided for resetting lens 14 to a start position, and for actuating the distance determining mechanism. Control member 110 is mounted for movement about pivot 116 fixed interiorly of the housing of the camera. The end of member 110 remote from pivot 116 extends through a slot (not shown) formed in mechanism plate 118. A plurality of detent portions 120 are formed in bent-over portion 124 of the plate to receive detent member 128 fixed to member 110. Control member 110 is formed of slightly flexible and resilient material so that the detent member may be aligned with a detent portion and released to seat therein. The detent portions may be designated respectively from the top as "on", "off", and "reset" as oriented in FIG. 3.

The three positions of control member 110 serve to define the function of the distance determining mechanism. In the central or "off" position, the member is spaced from a microswitch, representative of switch 80, which the member will engage adjacent one end of its throw, and is spaced from motor housing portion 130. The motor housing portion may be either an extension from or an integral part of the housing of motor 30, from which extends drive shaft 132. Pinion 134 is fixed on the end of drive shaft 132 remote from motor 30. The pinion is selectively movable into and out of mesh with drivable gear 138 about lens barrel 16, but is urged continuously toward mesh therewith by a biasing element, shown as spring 140. Hence, when the motor is energized, lens barrel 16 is rotated to reciprocatively position focusing lens cell 26.

After a focusing operation, activation of control member 110 to a "reset" position conditions lens 14 back to "start" for focusing at another distance. Upon shifting the member from the "off" position, the member engages motor housing extension portion 130 to move the motor housing about a pivot axis through shafts 142. This movement of the motor housing displaces pinion 134 from engagement with drivable gear 138 of the lens barrel. With the lens barrel free of the restraining force of the pinion, a return member, shown as spring 146, returns the lens, and therefore focusing cell, to "start". The amount of rotation of the barrel is limited by stop 148 which is engaged by cooperating portion 150 on the barrel, shown as the end of gear 138. The lens is thus conditioned for a new focusing operation.

A focusing operation is initiated by movement of control member 110 to the "on" or upper position. The initial movement from the "reset" position permits spring 140 to cause reengagement of pinion 134 with drivable gear 138. As the member approaches the "on" position, lug portion 154 engages and closes switch 80, thereby energizing the focus control circuit and motor 30. As earlier described, motor 30 drives for a predetermined time to reciprocate focusing cell 26 into focus on the remote subject. When the lens is focused, control member 110 is returned to the "off" position. Since pinion 134 remains in mesh with gear 138, lens 14 will remain in focus at this distance until reset for focusing at another distance.

It is to be understood that the embodiment shown is illustrative of the principal operation of a focusing mechanism for cameras which employ a pendulous rangefinder, and that certain changes, alterations, modifications or substitutions can be made in the structure of the mechanism without departing from the spirit and scope of the claims.

We claim:

1. In an optical instrument having a housing and a focusable objective lens arranged from said housing for focusing adjustment, the combination comprising:
   a pendulous member mounted for swinging movement relative to said housing to an angular aspect corresponding to focal distance; and
   motive means responsive to the angular aspect of the pendulous member for driving said objective assembly toward a focused condition.

2. A combination as in claim 1 in which said motive means comprises a motor for driving said objective assembly and electrical means responsive to the angular aspect of said pendulous member for energizing said motor to adjust said objective assembly.

3. A combination as in claim 2 wherein said electrical means includes circuit breaking means for deenergizing said motor when said objective is in focused condition.

4. A distance determining device for an optical instrument having a lens focusable on a remote subject at a distance defined by the inclination of a pendulous member orientable perpendicular to the axis of the objective wherein the axis defines the hypotenuse of a triangle and the instrument-to-subject distance defines the base of the triangle, the device comprising:
   lens adjusting drive means;
   a control circuit energizeable simultaneously with said drive means to control drive of the lens for focusing over a range of distances while said circuit is energized; and
   means in said control circuit responsive to the oriented position of said pendulous member for deenergizing said drive means with said lens focused on said subject.

5. The device as in claim 4 wherein said pendulous member is movable relative to a fixedly located variable resistance element connected to vary said control circuit in response to different oriented positions of said pendulous member.

6. The device as in claim 4 wherein said means in said control circuit responsive to said oriented position of said pendulous member includes a timing network, the actuation of which initiates upon energization of said circuit, and said timing network providing a preselected output voltage after a period of time determined by the position of said pendulous member.

7. The device as in claim 6 wherein said timing network is a resistance-capacitance network.

8. The device of claim 7 wherein a unijunction transistor is connected to a capacitor of said timing network wherein said transistor is triggered when the voltage across the capacitor reaches a predetermined value.

9. The device of claim 4 wherein a control member is movable manually to a plurality of positions, one of said positions initiating energization of said control circuit.

10. The device of claim 4 wherein a control member is movable manually to a plurality of positions, one of said positions conditions a focused objective to return to a start position for another focusing operation.